United States Patent
Setz et al.

(12) 
(10) Patent No.: US 6,491,964 B1
(45) Date of Patent: Dec. 10, 2002

(54) PRESSED PRODUCTS OF NON-CAKING SALT AND PROCESS OF MAKING

(75) Inventors: Gerhardus Johannes Alfonsus Maria Setz, Hengelo (NL); Willem Pries, Warnsveld (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/579,213

(22) Filed: May 26, 2000

Related U.S. Application Data

(60) Provisional application No. 60/154,720, filed on Sep. 20, 1999.

(30) Foreign Application Priority Data

May 27, 1999 (EP) .............................................. 99201679

(51) Int. Cl.[7] .............................................. A23L 1/237
(52) U.S. Cl. ........................... 426/649; 426/74; 426/97; 426/245; 426/285
(58) Field of Search ........................ 426/649, 74, 285, 426/97, 245

(56) References Cited

U.S. PATENT DOCUMENTS 5,478,515 A  12/1995  Waatti et al. ............... 264/113

FOREIGN PATENT DOCUMENTS

| GB | 908017 | 10/1962 |
| GB | 2 188 915 | 10/1987 |

OTHER PUBLICATIONS

Y. Yonei and T. Masuzawa in *Nippon Kaisui Gakkai–shi, 26,* (143), 1973, pp. 265–272.

Yamashita et al. in *Nippon Sembia Koska Chuo Kenkyu Hokoku, 111,* 1969, pp. 211–219.

Yamashita et al. in *Nippon Sembia Koska Chuo Kenkyu Hokoku, 111,* 1969, pp. 221–229.

Yamashita et al. in *Nippon Sembia Koska Chuo Kenkyu Hokoku, 111,* 1969, pp. 231–237.

Yamashita et al. in *Nippon Sembia Koska Chuo Kenkyu Hokoku, 111,* 1969, pp. 239–247.

*Primary Examiner*—Helen Pratt
(74) *Attorney, Agent, or Firm*—Ralph J. Mancini

(57) ABSTRACT

The invention relates to a process to make (com)pressed products of salt comprising iron ammonium hydroxypolycarboxylic acid complexes as anti-caking additive, as well as to the obtained pressed products and the use of these pressed products, for example as salt licks and/or water softener salt products.

12 Claims, 2 Drawing Sheets

CAKING STAGE OF THE TEST

CAKING STAGE OF THE TEST

DISCHARGE STAGE OF THE TEST

# PRESSED PRODUCTS OF NON-CAKING SALT AND PROCESS OF MAKING

The present application claims priority of European Patent Application Serial No. 99201679.0, filed on May 27, 1999 and U.S. Provisional Patent Application Serial No. 60/154,720, filed on Sept. 20, 1999.

FIELD OF THE INVENTION

The present invention relates to a process to manufacture pressed products from non-caking salt, the resulting products, and their use.

BACKGROUND OF THE INVENTION

Pressed products of salt are well-known. Examples of such products are salt licks and smaller bricks or tablets of salt for use in water softening installations. Typically, such pressed products are formed from salt that does not contain an anti-caking additive.

However, when salt that does not contain an anti-caking additive is used, salt will cake during storage and, accordingly, requires special measures such as immediate pressing after production. In practice, this means that pressing can only take place at the salt production facility, which is undesired. The use of common anti-caking additives in the salt prevents caking from occurring when the salt is stored, but will interfere with the process of (com)pressing the salt into a certain shape. Furthermore, if salt comprising sodium or potassium ferro cyanide, the most commonly used anti-caking additives, is used, the shape of the pressed products is easily disturbed, especially if they are submerged in brine. This means that smaller salt crystals will be dispersed in the brine, a phenomenon also known as "mushing", which can result in plugging of filters, feed lines, etcetera, which is undesired.

Surprisingly, we have found that the use of salt comprising one or more specific anti-caking agents does not lead to caking under normal conditions, e.g., in silos and 1,000 kg big bags, which are also known as flexible intermediate bulk containers (FIBC). However, the same non-caking salt can be formed into (com)pressed products, such as licks, bricks, and tablets, that retain their shape even when submerged in brine for a period of at least three weeks, preferably six weeks, and that show low levels of mushing. An explanation of this phenomenon, i.e. that this anti-caking agent prevents caking at lower pressures (during transport and storage), but allows caking/shaping when high pressures are applied, has not been found as yet.

SUMMARY OF THE INVENTION

The present invention generally relates to the use of salt comprising one or more iron ammonium hydroxypolycarboxylic acid complexes, preferably iron ammonium citrate complexes, as an anti-caking additive, for the manufacture of pressed products, the formed pressed products, and the use of said pressed products.

DETAILED DESCRIPTION OF THE INVENTION

Figure 1A:
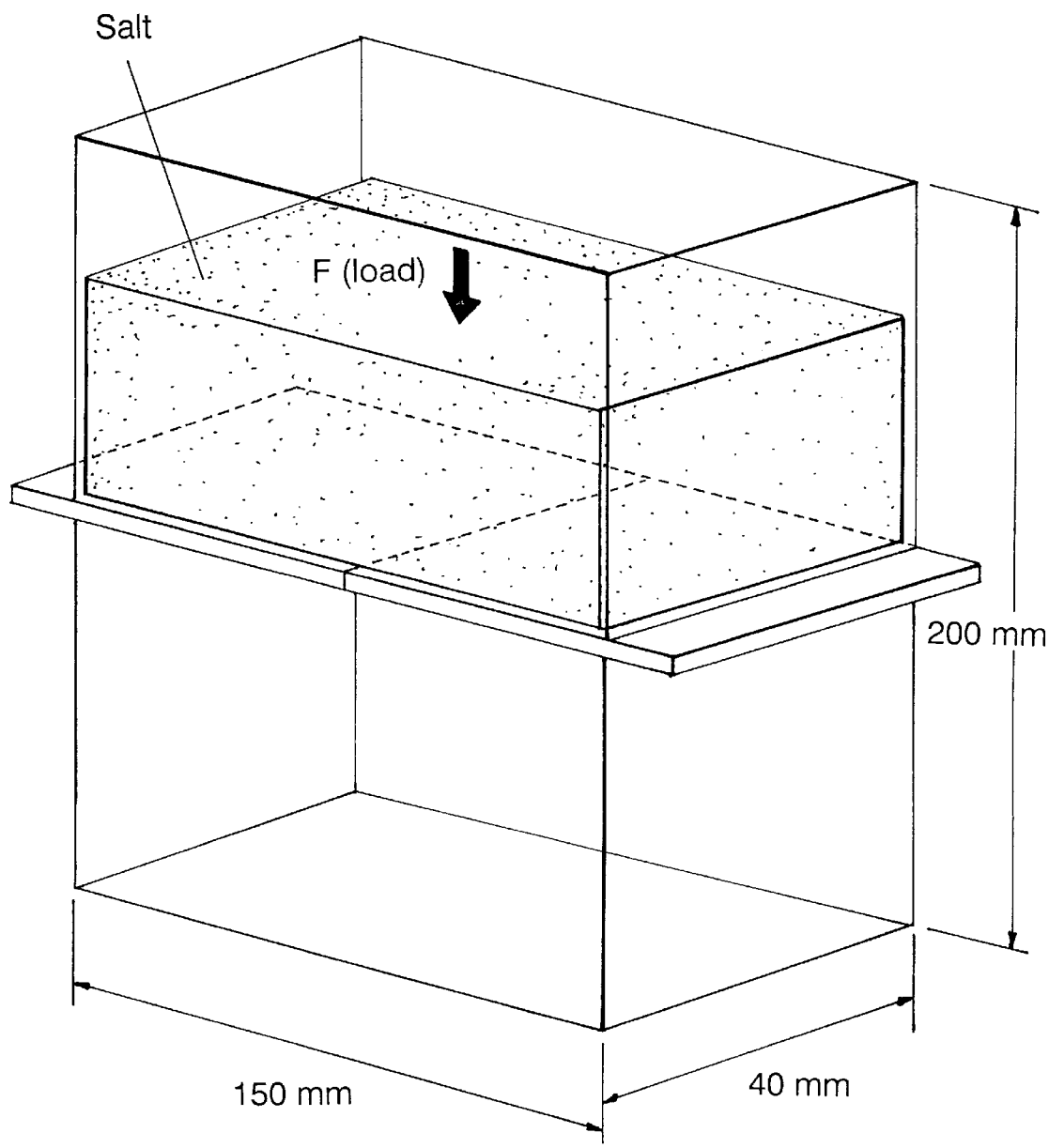
FIG. 1a is a rectangular box employed to determine caking behavior or flowability of salt. The box has a slit that can be opened. Salt is put into the box with the slit closed and for a period of time under varied conditions. The slit is then opened at a rate of 0.2 mm/s and the caking behavior or flowability of salt is measured.

Accordingly, the current invention relates to the use of salt comprising one or more iron ammonium hydroxypolycarboxylic acid complexes, preferably iron ammonium citrate complexes, as an anti-caking additive, for the manufacture of pressed products, the formed pressed products, and the use of said pressed products.

It is noted that salt comprising iron ammonium citrate complexes as an anti-caking additive is known in the art. See, for example, GB 908,017, the article of Y. Yonei and T. Masuzawa in *Nippon Kaisui Gakkai-Shi*, 26, (143), 1973, pp. 265–272, and the articles of A. Yamashita et al. in *Nippon Sembai Kosha Chuo Kenkyusho Kenkyu Hokoku*, 111, 1969, pp. 211–247. Herein it is described that various grades of iron ammonium citrate complexes were evaluated for their influence on the caking behaviour of salt. The tests to evaluate caking were the usual ones wherein storage and handling pressures are simulated. More particularly, the caking tests of Yonei and Masuzawa involve the pressing of treated water-containing salt in a mould with a pressure of 1,000 $N/cm^2$, while Yamashita et al. describe a caking test using a pressure of 500 to 1,000 $N/cm^2$ or a test wherein a pile of salt is evaluated for its caking behaviour.

None of the non-caking salt formulations were subjected to a test wherein the salt is moulded/shaped using a pressure in the range of 5,000–25,000 $N/cm^2$. It was surprisingly found by the inventors that non-caking iron ammonium hydroxypolycarboxylic acid complex-based non-caking salt formulations, particularly iron ammonium citrate-based non-caking salt formulations, show excellent caking/shaping at these pressures, resulting in stable pressed products. By stable pressed products is meant that the products do not disintegrate and/or form crystals or fragments of 1 $mm^3$ or, smaller when submerged in brine at 20° C. for 3 weeks and/or pass the mushing test as presented below.

The pressure used to produce the stable pressed products preferably is from 5,000–20,000 $N/cm^2$. The shape of the pressed products is not critical and may take the form of bricks, rods, pellets (including pellets with a mean diameter of about 2 mm), tablets, (broken) sheets, nuggets or cushions, and the like. The skilled person easily determines the pressure that is best used to make any of these shaped products by analyzing the formed products. It was observed that bricks can successfully be formed at pressures of 9,000–10,000 $N/cm^2$, tablets can be made using pressures of 7,000–10,000 $N/cm^2$, sheets by using a pressure of about 20,000 $N/cm^2$, and nuggets/cushions using a pressure of 15,000–20,000 $N/cm^2$; however, there is no wish to be limited to these pressures.

The term "salt" as used throughout this document is meant to denominate all salts of which more than 25% by weight is NaCl. Preferably, such salt contains more than 50% by weight of NaCl. More preferably, the salt contains more than 92% by weight of NaCl, while a salt of more than 99% by weight NaCl is most preferred. It is preferred that the salt contains less than 5% by weight water. More preferably, the salt contains less than 3% by weight, even more preferably less than 1% by weight, and most preferably less than 0.5% by weight of water. Preeminently suitable for use in the process according to the invention is a salt comprising up to 0.1% by weight of water. The salt may be rock salt, solar salt, salt obtained by evaporation of water from brine, and the like.

The hydroxypolycarboxylic acids that can be used according to the invention are selected from compounds having from 3 to 10 carbon atoms, one or more hydroxy groups, and two or more carboxylic acid groups, or mixtures of such acids. Preferably, the hydroxypolycarboxylic acids include citric acid, tartaric acid, gluconic acid, saccharic acid, mucic acid, and isomers thereof. Iron ammonium complexes of these hydroxypolycarboxylic acids were found to render salt non-caking at low concentrations. Even more preferred are hydroxypolycarboxylic acid mixtures comprising citric acid.

The preferred pH range of the non-caking iron ammonium hydroxypolycarboxylic acid complex-based salt, measured as described below, depends on the specific hydroxypolycarboxylic acid complexes that are present on the salt. For instance, Yonei reports that for the preferred iron ammonium citrate complexes, the preferred pH range is 7–14, preferably about 8.5–9. However, Yamashita et al. disclose that, depending on the iron ammonium ratio used, the complexes will have a different pH when dissolved in water, and the preferred pH of the solution comprising the iron ammonium citrate that is sprayed onto the salt, which is a preferred way of introducing the anti-caking agent onto the salt grains, is to be controlled at about 5.5. Which exact pH range works best for the specific iron ammonium hydroxypolycarboxylic acid used can be established simply by evaluating the caking and the mushing behaviour of salt treated with iron complexes of these products at the various pHs. A preferred pH range for the iron ammonium complexes according to the invention was found to be from 4 to 10. More preferably, the pH is from 5 to 7, while for the citrate complex a pH of about 6 was found to be most preferred.

The pH can be adjusted, if so desired, by means of any conventional acid or base. The acid or base can be added separately or together with the anti-caking agent. Preferably, a solution comprising one or more of the iron ammonium complexes of hydroxypolycarboxylic acid as well as the pH controlling agent is added to the salt. The way the anti-caking agent and the acid or base are introduced depends on the desired water content of the resulting salt and the water content of the salt to be treated. Typically, a concentrated solution of the agents is sprayed onto the salt. The agents can be added to either wet or dry salt. Furthermore, the treated salt may be dried, if so desired. Preferably, salt containing about 2.5% by weight of water, e.g., from a centrifuge or other process step, is treated with anti-caking agent and, optionally, pH adjusting agent and subsequently dried. However, also salt with an higher initial water content can be used. Preferably the treated salt is dried such that the water content is less than 1% by weight, more preferably less than 0.5% by weight, and, most preferably, less than 0.1% by weight of the final product. Such operations result in salt which is free-flowing and which is pre-eminently suited for shaping according to the invention.

If so desired, an additional pH buffer can be added to the salt and/or the treatment solution. The buffers to be used are of the conventional type. Preferably, they are organic acids. More preferably, they are carboxylic acids. The acid of choice should have a pK value in aqueous solution around the desired pH, as is known in the art. The pH buffer can be used with or without the optional pH control agent being used. The pH buffer can be introduced into the salt composition by spraying the pure compound, a separate solution, and/or by introduction after mixing with the anti-caking treatment solution. Preferably, the treatment solution sprayed onto the salt comprises an iron source, an ammonium source, a hydroxypolycarboxylic acid, preferably citric acid, optionally a pH control agent, and optionally a pH buffer.

If so desired, the iron ammonium hydroxypolycarboxylic acid complex-containing treatment solution may contain NaCl. Such NaCl-containing solutions were found to be more effective in making the salt non-caking than plain water-based solutions. Preferably such NaCl-containing solutions comprise 15–25%, more preferably 20–25% by weight of NaCl. It is noted that other salts, such as KCl and/or $NH_4Cl$, can be used to replace (part of) the NaCl.

Furthermore, such treatment solutions can contain optional products to complex Mg ions, such as sodium hexametaphosphate. Especially when the hexametaphosphate is used in combination with iron ammonium citrate, improved results have been reported. Furthermore, it may be advisable, depending on the quality of the iron ammonium complex that is used, to first treat the complex with $H_2O_2$ to increase its efficiency, as is known in the art, see, for example, A. Yamashita et al. in *Nippon Sembai Kosha Chuo Kenkyusho Kenkyu Hokoku*, 111, 1969, pp. 231–237.

Because the valency of the iron in the salt and the ratio of iron to ammonium may vary, because there may be Na, K, Mg and/or Ca ions present next to the ammonium ions, and because different types of hydroxypolycarboxylic acids, with various amounts of carboxylic acid groups per molecule, can be used according to the invention, the molar ratio of iron to hydroxypolycarboxylic acid as well as the ratio of ammonium to hydroxypolycarboxylic acid may vary over a wide range. Both di- and tri-valent iron ions (ferro- and ferri-ions, respectively) were used with success. Practically, the iron in the final salt formulation will be present in both valencies. Therefore, the term "iron ammonium hydroxypolycarboxylic acid complex" as used throughout this document typically denotes compositions comprising iron ions in various valencies, ammonium ions, and at least one hydroxypolycarboxylic acid moiety in ionic form.

The amount of hydroxypolycarboxylic acid in respect of the amount of iron ions will depend on whether ferro- or ferri-ions are present, on the ratio of iron to ammonium ions, on the presence of for instance Na, K, Mg and/or Ca ions in the complex, and on the nature of the hydroxypolycarboxylic acid, particularly the amount of carboxylic acid substituents per mole of acid. Preferably, the resulting iron ammonium complex is neutral in charge. For the preferred iron ammonium citrate anti-caking agent, the molar ratio of iron to citrate ions suitably is from 0.5 to 2. The molar ratio of ammonium ions to citrate can vary over a wide range, depending, inter alia, on the ions that are part of the complex. A preferred molar ratio of ammonium to citrate ions is from 0.5 to 2. For the preferred iron ammonium citrate, a molar ratio of citric acid to ammonium ion to iron ion of about 1:1:1 was found to be suitable. This ratio was also found in suitable commercial grades of iron ammonium citrate as used in the examples.

The iron ammonium hydroxypolycarboxylic acid complexes preferably are used in an amount such that 0.1–20 mg of iron per kg is introduced into the final non-caking salt formulation. More preferably, the amount used introduces 0.25–10 mg iron per kg of the formulation, while most preferably, the amount of iron introduced is 0.5–7 mg/kg. For low mushing of the (com)pressed products, the amount of iron ammonium hydroxypolycarboxylic acid used preferably is selected towards the low end of the range. For low mushing iron ammonium citrate-containing salt nuggets, the preferred amount of iron that is introduced ranges from 0.5 to 3.5 mg per kg of product, while a range of 0.5–2.5 mg/kg is most preferred.

If so desired, conventional anti-caking additives may be used together with the anti-caking agent of the invention, provided that the introduction of such a conventional additive does not adversely affect the caking of the salt and/or the properties, particularly the breaking strengths and mushing, of the (com)pressed products. If such a combination of anti-caking agents is used, it is preferred to use less than 50% by weight of the conventional anti-caking agent, more preferably less than 25% by weight, even more preferably less than 10% by weight, and, most preferably, less than 5% by weight, all based on the weight of all anti-caking agent used.

The (com)pressed products obtained in the process according to the invention are suitable for use as salt licks but are preferably used in cases where a high wet breaking strength is required. High wet breaking strength typically is required in operations where salt is dissolved in a batch or continuous fashion and where the salt typically is submerged in brine. Examples of such operations typically can be found in installations where ion exchange resins are regenerated using brine, as is known in the art. Accordingly, the (com)pressed products of the invention are preeminently suited for use in salt dissolvers of water softening installations.

Experimental

The pH of salt is measured as follows:

First, at a temperature of 20° C., a saturated NaCl solution (brine) is made of which the pH is adjusted to 7 by means of NaOH and/or HCl. Then 100 g of the salt to be analyzed are added to 100 ml of the brine, and the resulting slurry is stirred for 10 minutes at 20° C. The pH of the water after said stirring is the pH of the salt.

Adhering water in salt is determined by weight loss measurement upon drying by subjecting 27.5 g of salt to at least 650 W of microwave radiation during 20 minutes.

Figure 1B:
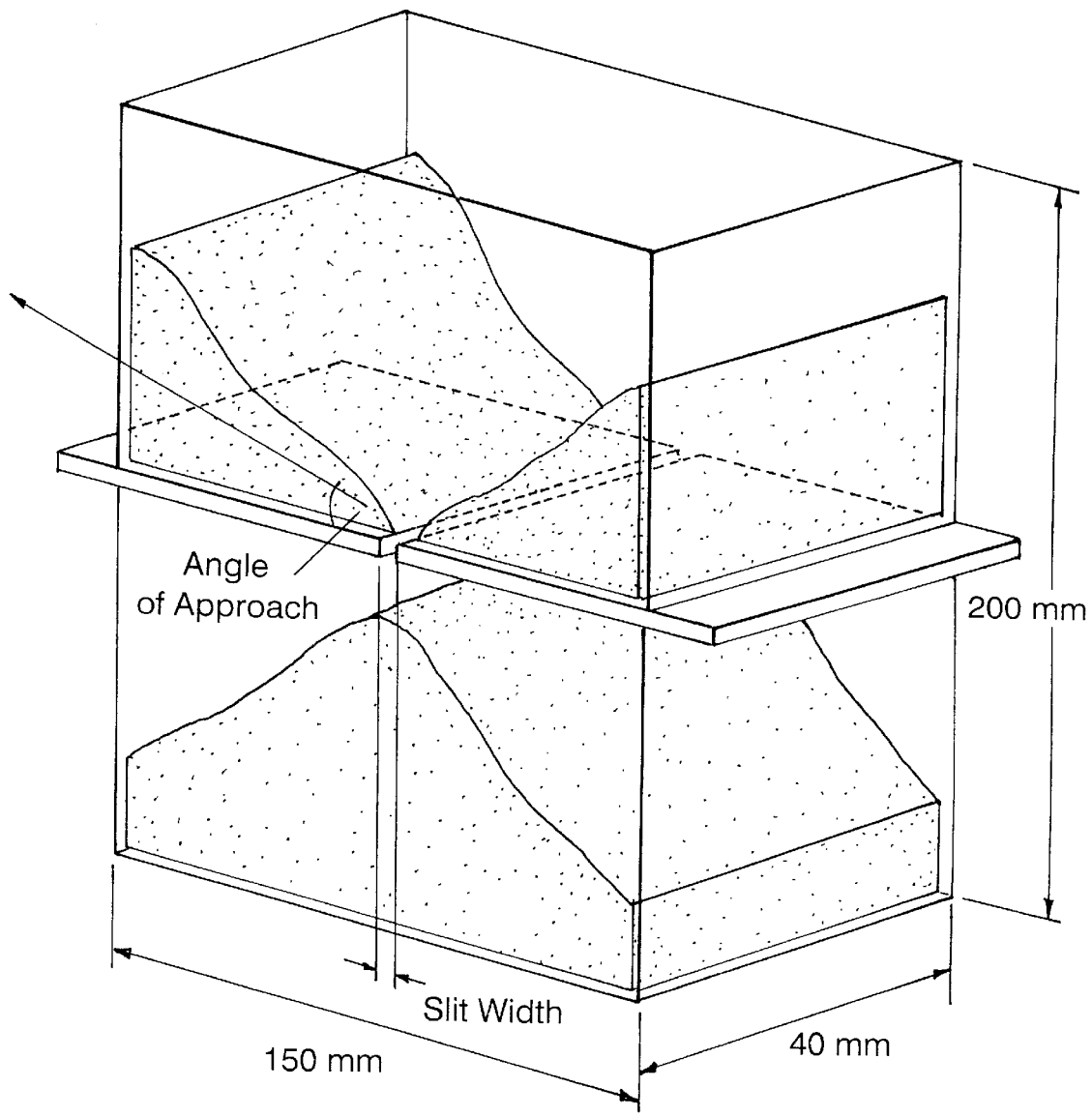
FIG. 1b depicts the rectangular box of FIG. 1a with the slit opened. Flowability is measured by analyzing the width of the slit required to obtain a flow of salt through the slit and the average angle of the residual material with respect to the horizontal.

Caking behaviour, or flowability, of the salt is determined using a rectangular box as depicted in FIG. 1a. After the salt has been stored in the box for a certain time period, subjected to an alternating climate and to a certain load which reflects the usual storage and handling conditions (see the examples), the slit is opened at a rate of 0.2 mm/s, resulting in a situation as depicted in FIG. 1b. Flowability is judged by analyzing the width of the slit required to obtain a flow of salt through said slit and the average angle of the residual material with respect to horizontal.

The wet and the dry breaking strength are analyzed by measuring the force needed to break a (com)pressed tablet placed on a load cell. The tablets were made on a laboratory press, Herzog type HTP 40 (1993), with adjustable compaction force. The adjusted force on the salt was 7850 N/cm². The tablet diameter was 2.5 cm and the weight was 15 g.

The dry breaking strength is measured after exposing the (com)pressed product to environmental air. The wet breaking strength is measured after the (com)pressed product has been submerged in saturated NaCl solutions for a certain period of time.

In both instances the breaking strength is defined as the maximum force that a tablet put on its side can be exposed to before it breaks, divided by the breaking surface area. The tablet typically breaks in the middle. Hence the breaking strength is calculated from the measured maximum force and the dimensions of the tablet per the following formula Formula:

$$\sigma = \frac{2 * F\max * 9.81}{\Pi * D * w}$$

wherein:
$\sigma$=breaking strength ( N/cm²)
$F_{max}$=maximum breaking force (kg)
D=tablet diameter (cm)
w=tablet thickness (cm)

Mushing of (com)pressed salt products was evaluated on the basis of the "Pellet Mush Volume Test" as issued by the Cutler-Magner Salt Company. More particularly, about 860 g of whole (com)pressed salt products (nuggets, tablets, or the like) were selected and transferred to a cylinder with a diameter of 12.5 cm and a height of 18 cm. Then 1 liter of distilled water was added and the cylinder was closed. The cylinder was shaken in a Turbula® T2F shaker-mixer for 20 minutes at ambient temperature, using a shaking speed of about 45 rpm. The saturated brine that is formed is decanted and saved for subsequent washing. The remainder of the salt/brine is poured on a sieve with holes of 2.36 mm (8 mesh screen), and washed with the brine. The filtrate, containing fines, was collected in an "Imhoff" cone. After settling for a period of 30 minutes, the amount of mush, the volume of fines in said brine, at the bottom of the cone was recorded. To pass the test, less than 20 ml of mush is to be formed. Preferably, the mushing is below 15 ml, more preferably below 10 ml, and most preferably below 5 ml.

In experiment 1 iron ammonium citrate supplied by Fluka as "Ammonium ferric citrate, brown", Number 09714 was used. Analysis of this product showed that it contains approximately 64 g/kg of $NH_4$, 205 g/kg Fe, and 585 g/kg citrate. In the later experiments, commercial iron ammonium citrate ex Paul Lohman was used that contained about 78 g/kg of $NH_4$, 200 g/kg Fe, and 615 g/kg citrate.

EXAMPLE 1 and

Comparative Examples A and B

Salt, with a water content of less than 0.1% by weight and a pH of 8.5 was mixed with a solution containing 17 g/l anti-caking agent as specified in the table, 45 g/l $H_2SO_4$, and 250 g/l NaCl. In total 0.55 ml of the solution was used per kg of salt. The resulting mixture was dried at 60° C. using a fluid bed drier so that the water content of the resulting salt composition was less than 0.1% by weight of water. The pH of the resulting salt was observed to range from 6 to 6.5. After tabletting, the dry breaking force was determined directly, meaning within 1 hour of pressing the last tablet, and after 24 hours.

| Exam- | Salt composition used | | 0 hour | 24 hours |
|---|---|---|---|---|
| ple | Anti-caking agent | mg/kg | N/cm² | N/cm² |
| A | None | — | 119 | 195 |
| B | Potassium ferrocyanide | 4 (as Fe(CN)₆) | 34 | 23 |
| 1 | Iron ammonium citrate | 2 (as Fe) | 92 | 88 |

The dry strength of iron ammonium citrate complex-containing salt was better than the dry strength of products pressed by using salt with common anti-caking agent.

The wet breaking strength of the same pressed products was determined after a number of days, as indicated in the following table. The wet breaking strength is given in N/cm².

| | Days of submersion in brine | | | | | | | | |
|---|---|---|---|---|---|---|---|---|---|
| Example | 0 | 1 | 4 | 6 | 8 | 14 | 21 | 28 | 42 |
| A | 119 | 91 | 109 | 102 | 106 | 70 | 79 | 57 | 64 |
| B | 34 | 0 | 0 | 0 | 0 | 0 | 0 | 0 | 0 |
| 1 | 92 | 100 | 146 | 123 | 131 | 60 | 80 | 93 | 65 |

Clearly, the iron ammonium citrate complex-containing salt tablets require a wet breaking force which is much higher than that for products pressed using salt with common anti-caking agent, and at least as good as the wet breaking force of salt that does not comprise an anti-caking additive.

The flowability of the salt that was used to make the pressed products of the above examples was determined by measuring the flowability of the salt using the apparatus as described above. In one example additional water was absorbed by the salt to increase its moisture content. Before being subjected to the test, the salt was first conditioned in said apparatus using a daily cycle of 2 hours at 10° C./90%RH, 2 hours at 25° C./50%RH, 2 hours at 10° C./90%RH, and 18 hours 15° C./70%RH (RH is relative humidity).

| Example | 3 days conditioning Pressure 0.1 N/cm² Moisture <0.1% w/w | 2 days conditioning Pressure 5 N/cm² Moisture 0.1% w/w | 3 days conditioning Pressure 5 N/cm² Moisture 2.5% w/w |
|---|---|---|---|
| A | o/+ | o | – |
| B | + | o/+ | o/+ |
| 1 | o/+ | + | o/+ |
| | Minimal required slit width (mm) | | |
| A | 6 | 3 | >150 |
| B | 3 | 2 | >150 |
| 1 | 3 | 2 | >150 |
| | Average angle (°) of residual material | | |
| A | 55 | 40 | n.d. |
| B | 36 | 37 | n.d. |
| 1 | 36 | 37 | n.d. | n.d. = not determined
– = caking observed,
o = some lumps,
+ = free flowing (Visual judgement)

From these results it follows that the flowability of uncompressed salt containing iron ammonium citrate is as good as the flowability of salt comprising conventional anti-caking agents and much better than that of salt that does not comprise an anti-caking agent. At the same time, however, the compressed product of the invention is about as strong as compressed products obtained from salt not comprising an anti-caking additive but much stronger than salt comprising a conventional anti-caking additive.

EXAMPLES 2–4 and

Comparative Example C

In these examples, the effect of the amount of anti-caking agent on the strength of the pressed product was investigated. The pH of the salt was not adjusted.

Accordingly, salt with a water content of less than 0.1% by weight was mixed with a solution containing, if used, 17 g/l of iron ammonium citrate, corresponding to an iron level of about 3.4 g/l, and 250 g/l of NaCl. In experiments 2–4, 0.29, 0.58, and 0.88 ml of said solution was used per kg of salt, respectively, in order to add the amounts of anti-caking agent as indicated in the table below. The resulting mixture was dried at 60° C. using a fluid bed drier so that the water content of the resulting salt composition was less than 0.1% by weight of water. Then, tablets were pressed as described above. It is noted that the amount of iron in the tablets was slightly higher than the amount added by means of the anti-caking agent because of the presence of some Fe in the salt that was treated. Analysis of the tablets showed total Fe levels to range from 0.9 mg/kg in Comparative example C to 4.4 mg/kg in Example 4.

The dry breaking force of the tablets was determined directly, meaning within 1 hour of pressing the last tablet, and after 24 hours. The wet breaking strength was determined after 1 and 3 weeks submersion in brine. The results are presented in the following table.

| Example | AA* mg/kg | Dry breaking strength | | Wet breaking strength | |
|---|---|---|---|---|---|
| | | 0 hour N/cm² | 24 hours N/cm² | 7 days N/cm² | 21 days N/cm² |
| C | None | 109 | 251 | 112 | 97 |
| 2 | 1 | 78 | 220 | 83 | 85 |
| 3 | 2 | 81 | 175 | 105 | 114 |
| 4 | 3 | 66 | 158 | 91 | 98 |

*AA = Amount of anti-caking agent (iron ammonium citrate), expressed as mg Fe per kg of tablet.

Clearly, an amount of iron ammonium citrate that corresponds to 2–3 mg/kg of iron gives very good dry and wet breaking strength. The treated salt of Examples 2–4 showed acceptable non-caking properties, while the pH was in the 4–10 range.

EXAMPLES 5–7

The procedure of Examples 2–4 was followed on production scale to make a salt containing an amount of iron ammonium citrate of 1.5, 2, and 3 mg/kg (expressed as mg Fe per kg of tablet), respectively. The salt showed an acceptable caking performance, and nuggets were produced from it. When subjected the nuggets to the mushing test, an amount of 1.5, 2, and 1 ml of mush was formed, respectively.

What is claimed is:

1. A process for making shaped products from salt which comprises adding an iron ammonium complex of a hydroxypolycarboxylic acid to said salt in an amount sufficient to render said salt non-caking, and compressing said salt and said iron ammonium complex at pressures of from 5,000 to 25,000 N/cm², wherein said salt has a pH of from 4 to 10.

2. The process of claim 1 wherein the salt that is compressed comprises less than 0.1% by weight of water.

3. The process of claim 1 wherein the iron ammonium complex of the hydroxypolycarboxylic acid is used in an amount to introduce from 0.1 to 20 mg/kg of iron into the final product.

4. The process of claim 1 wherein the iron ammonium complex of a hydroxypolycarboxylic acid is iron ammonium citrate.

5. The process of claim 4 wherein the molar ratio of iron to citrate ions is from 0.5 to 2 and the molar ratio of ammonium to citrate ions independently is 0.5 to 2.

6. The process of claim 1 wherein the salt further comprises a pH buffering agent.

7. Shaped salt products prepared by the process of claim 1.

8. Shaped salt products of claim 7 in the form of bricks, rods, pellets, tablets, (broken) sheets, or nuggets/cushions.

9. A salt lick which comprises the shaped salt products of claim 7.

10. A salt dissolver which comprises the shaped salt products of claim 7.

11. An ion exchange resin regeneration installation which comprises the salt dissolver of claim 10.

12. A water softening installation which comprises the ion exchange resin regeneration installation of claim 11.

* * * * *